(12) United States Patent
Feehrer

(10) Patent No.: US 8,151,145 B2
(45) Date of Patent: Apr. 3, 2012

(54) FLOW CONTROL TIMEOUT MECHANISM TO DETECT PCI-EXPRESS FORWARD PROGRESS BLOCKAGE

(75) Inventor: John R. Feehrer, Westford, MI (US)

(73) Assignee: Oracle America, Inc., Redwood City, CA (US)

( * ) Notice: Subject to any disclaimer, the term of this patent is extended or adjusted under 35 U.S.C. 154(b) by 584 days.

(21) Appl. No.: 12/061,667

(22) Filed: Apr. 3, 2008

(65) Prior Publication Data

US 2009/0254692 A1 Oct. 8, 2009

(51) Int. Cl.
*G06F 11/00* (2006.01)
(52) U.S. Cl. .............. 714/43; 714/44; 714/47.1; 714/48
(58) Field of Classification Search ................ 714/43, 714/47, 48, 44, 47.1
See application file for complete search history.

(56) References Cited

U.S. PATENT DOCUMENTS

| | | | |
|---|---|---|---|
| 2002/0184570 A1* | 12/2002 | Etgen | 714/42 |
| 2003/0233396 A1* | 12/2003 | Wolfe, Jr. | 709/200 |
| 2006/0206655 A1* | 9/2006 | Chappell et al. | 710/315 |
| 2007/0008898 A1* | 1/2007 | Sharma et al. | 370/252 |
| 2007/0174733 A1* | 7/2007 | Boyd et al. | 714/48 |
| 2007/0208899 A1* | 9/2007 | Freking et al. | 710/313 |
| 2007/0234130 A1* | 10/2007 | Sullivan et al. | 714/43 |
| 2007/0255787 A1* | 11/2007 | Richardson et al. | 709/204 |
| 2008/0016265 A1* | 1/2008 | Oshikiri et al. | 710/309 |
| 2008/0235429 A1* | 9/2008 | Gundam et al. | 710/313 |

* cited by examiner

*Primary Examiner* — Scott Baderman
*Assistant Examiner* — Sarai Butler
(74) *Attorney, Agent, or Firm* — Brooks Kushman P.C.

(57) ABSTRACT

A method for detecting lack of forward progress in a PCI Express includes a step in which a data flow measurement is received or performed. This data flow measurement provides the capacity of the connected Switch or Endpoint device to receive data packets from a Root Complex transmit channel. An error is logged when the data flow measurement does not substantially change in a predetermined period of time. A recovery protocol is executed after logging of the error. A system implementing the method of the invention is also provided.

20 Claims, 5 Drawing Sheets

FLOW CONTROL TIMEOUT MECHANISM TO DETECT PCI-EXPRESS FORWARD PROGRESS BLOCKAGE

BACKGROUND OF THE INVENTION

1. Field of the Invention

In at least one aspect, the present invention relates to process for improving data flow in a PCI-Express fabric.

2. Background Art

PCI-Express ("PCIe") has become the most prevalent input/output ("I/O") interconnect technology for a wide range of computer systems, from workstations up through high-end servers. The technology has many built-in features that provide a high level of system reliability, accessibility, and serviceability ("RAS").

PCIe utilizes a credit based flow control scheme in which a device advertises the number or amount of space available in its buffers. PCIe flow control is done on a per-hop basis, i.e. the flow control is local between a pair of devices. The PCIe specification defines a separate flow control resource for each of the following types of packets: posted request packets, non-posted request packets, and completion packets. A device keeps separate flow control credit counters for header and data, for each of the three packet types. Accordingly, a PCI device contains 6 different counters. Flow control credits are returned from the receiver to the sender periodically, as the receiver frees buffer space for each respective packet type. The return of credits is done using Update Flow Control ("UpdateFC") Data Link Layer Packets "(DLLPs"), where there is a separate UpdateFC type for each of the three types above. A given UpdateFC specifies credits for both header and data, in two separate fields.

The PCIe architecture defines an optional flow control timeout error, which fires when a sender has not received an UpdateFC DLLP of a given type for a specified period of time. For the PCIe 2.0 spec., that time is 200 usec. The timer is reset by the receipt of an UpdateFC DLLP. When the timer expires, the error is logged and the Physical Layer is instructed to retrain the link. While this error is designed to catch hardware faults that prevent a device from sending UpdateFC packets, it cannot detect the case where UpdateFC packets are received, but the credit value returned in the UpdateFC packet never changes. In other words, a device may send UpdateFC packets on a regular basis but due to congestion or faults in the fabric downstream of the device, it never frees space in its buffers and so never returns credits to the sending device. In such a situation, forward progress is hindered because the sending device is not able to send packets (of a given type, or perhaps of multiple types).

Although the present implementations of PCIe work quite well, there are several conspicuously missing features in the current generation of the protocol. An example of such a desirable feature is a method for detecting and signaling when a PCIe device is failing to make forward progress. Forward progress in this context means that a device is able to issue transaction requests and have them completed in a timely manner. The same device is also able to issue responses to transactions for which it is the target in a timely manner. Forward progress can be stalled when a device does not have flow control credits needed to issue packets onto the link—whether they are requests or completions (responses to requests issued earlier to the device).

Accordingly, for at least these reasons, there is a need for methods that facilitate data movement in a PCI Express connection.

SUMMARY OF THE INVENTION

The present invention solves one or more problems of the prior art by providing in at least one aspect a method for detecting lack of forward progress in a system having a Root Complex communicating with one or more connected Switches or Endpoint devices. The method of the present invention includes a step in which a data flow measurement is received or performed. This data flow measurement provides the capacity of a connected Switch or Endpoint device to receive data packets from a Root Complex transmit channel. An error is logged when the data flow measurement does not substantially change in a predetermined period of time. A recovery protocol is executed after logging of the error. Advantageously, the present invention provides a software implemented mechanism for detecting possible serious congestion or hardware faults in a PCIe connection.

In another embodiment of the present invention a PCI Express module is provided. The control module of this embodiment includes a receive buffer for receiving Transaction Layer Packets ("TLPs") from a connected downstream device and a transmit buffer for transmitting TLPs to the connected downstream device. A PCI Express controller for providing TLPs to the transmit buffer and for processing TLPs received into the receive buffer. A dual simplex PCI Express link in communication with the transmit buffer and a connected downstream device. The dual simplex PCI express link includes a receive channel and a transmit channel. The module also includes a capacity module and a timeout module The capacity module provides information about the capacity of the PCI Express module to receive data. The timeout module operable receives data flow information from the connected downstream device regarding a data flow measurement of the connected downstream device's capacity to receive data packets from the PCI Express module. Advantageously, the timeout module logs an error when the data flow measurement does not change after predetermined period of time.

DETAILED DESCRIPTION OF THE PREFERRED EMBODIMENT(S)

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

Figure 1:
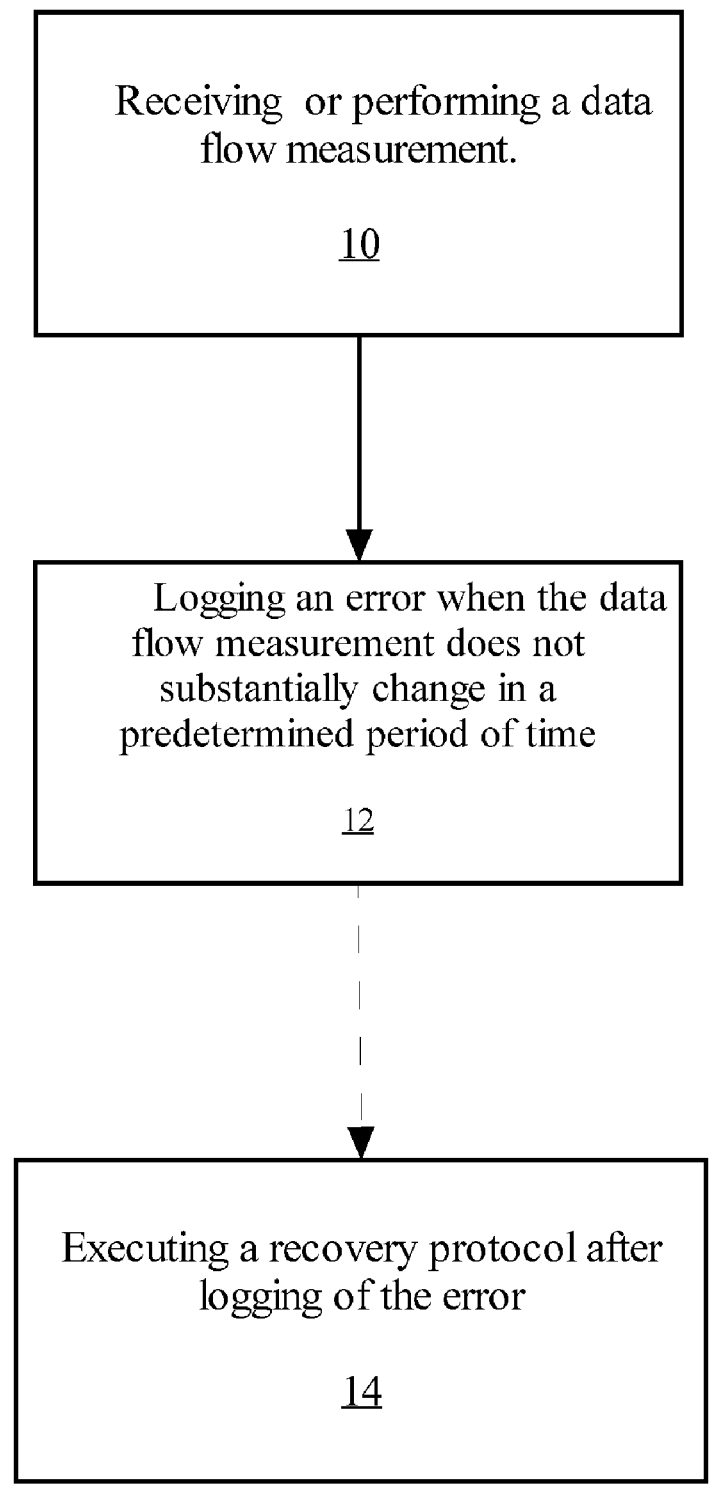
FIG. 1 is a flowchart of a method for detecting the lack of forward data flow progress in a PCI Express fabric.

With reference to FIG. 1, a flow chart describing a method for detecting lack of forward progress in a system having a Root Complex utilizing a PCI Express interface for communicating with a connected PCI Express switch or Endpoint device is provided. The method of the present invention includes a step in which a data flow measurement is received or performed (box 10). This data flow measurement provides the capacity of the Root Complex to receive data packets from the connected device. An error is logged when the data flow measurement does not substantially change in a predetermined period of time (box 12). Finally, a recovery protocol is executed after logging of the error (box 14).

Figure 2:
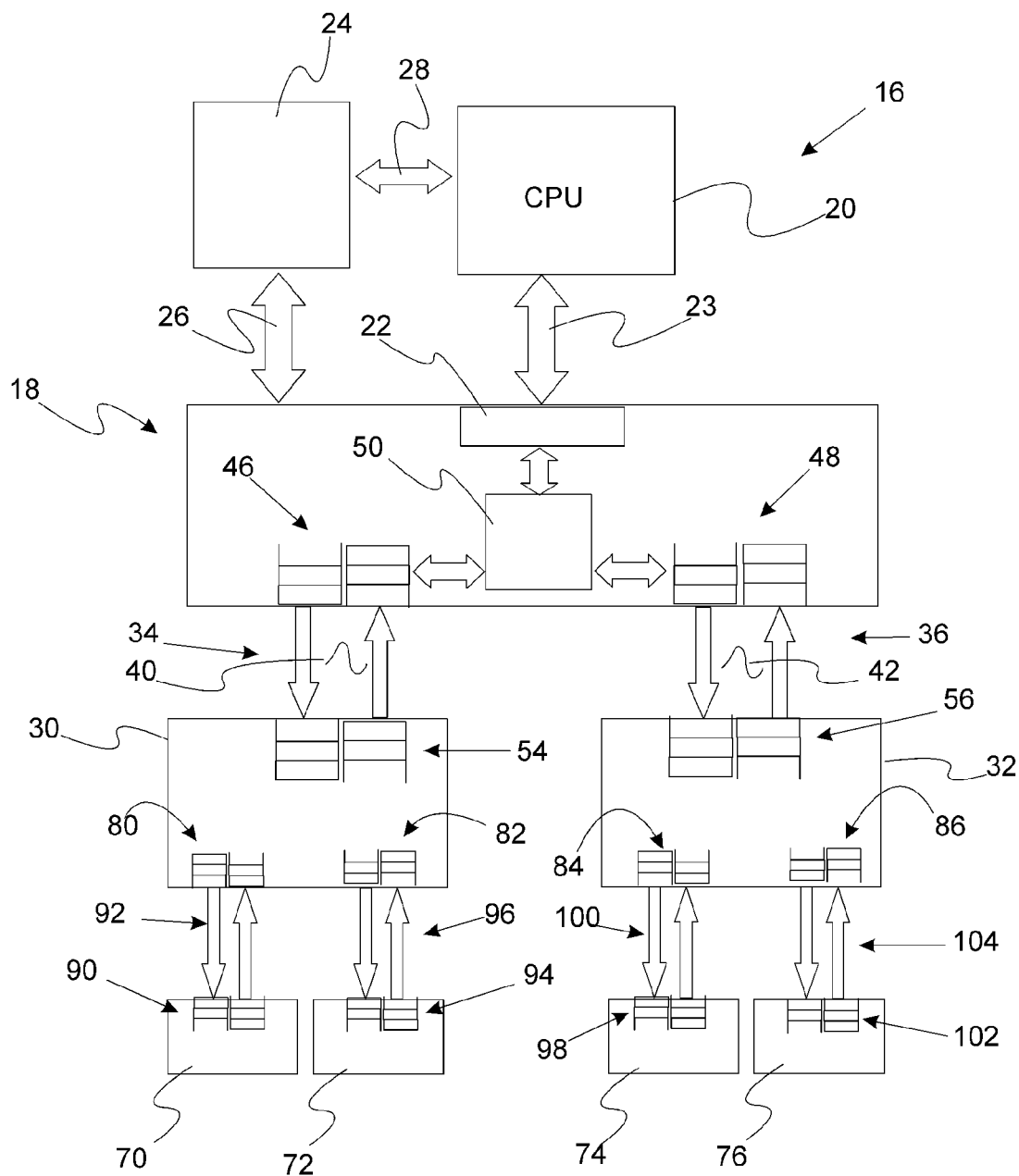
FIG. 2 is a schematic illustration of a PCI Express input/output hierarchy tree illustrating an embodiment of the present invention.

With reference to FIG. 2, a schematic illustration of a PCI express system utilizing the method of the present invention is provided. PCI Express hierarchy tree 16 includes Root Complex 18. The term "Root Complex" as referred to herein refers to the root node of an input/output PCI Express hierarchy tree such as PCI Express hierarchy tree 16. Root Complex 18 communicates with CPU 20 utilizing PCI bridge 22 and PCI Express interface 23. Root Complex 18 is also in communication with memory 24 via interface 26. CPU 20 addresses memory 24 via address bus 28. Specific examples of useful interfaces are known to those skilled in the art of computer interface hardware. Specific useful examples of such interfaces include, but are not limited to, parallel buses, serial point-to-point links, and combinations thereof. Root Complex 18 also communicates with switches 30, 32 via PCI Express links 34, 36. Each of PCI Express links 34, 36 are dual simplex links which include a transmitting and receiving channel. It is readily understood, that links 34, 36 comprise printed circuit board traces or cables that attached to adapters in Root Complex 18 and switches 30, 32. PCI Express switches are a logical assembly of multiple virtual PCI-PCI bridge devices that enable one or more downstream Endpoint devices or other PCI Express switches to communicate with an upstream Root complex such as Root complex 18 or upstream PCI Express switches when present. Transaction Layer Packets ("TLP") 40, 42, are exchanged between Root Complex 18 and switches 30, 32.

Still, referring to FIG. 2, Root Complex 18 includes buffers 46, 48, for receiving and transmitting TLPs 40, 42. Buffers 46, 48 are in communication with control logic hardware 50 which is in turn in communication with PCI bridge 22. Similarly, switches 30, 32 include buffers 54, 56 also for receiving and transmitting TLPs 40, 42. During operation, Root Complex 18 receives data flow measurements from switches 30, 32. Typically, these data flow measurements are the credits utilized in the credit flow system that is used in PCI Express fabrics.

In a variation of the present invention, control logic hardware 50 implements the method of the present invention set forth below. In one refinement, such hardware includes a computer processor implementing one or more steps of the method set forth below. In such an implementation, the computer processor will execute instructions encoded in a computer memory that is accessible to the computer processor. Specifically, control logic hardware 50 will detect the failure to make forward flow process and log an error upon such an occurrence.

PCI Express hierarchy tree 16 also includes Endpoint devices 70, 72, 74, 76. In the I/O tree depicted in FIG. 1, switch 30 exchanges TLPs with Endpoint devices 70, 72 while switch 32 exchanges TLPs with Endpoint devices 74, 76. In order to effectuate these exchanges, switch 30 includes buffers 80, 82 and switch 32 includes buffers 84, 86. Endpoint device 70 includes buffers 90 which form PCI Express link 92 with buffers 80 in an analogous manner to that set forth above. Endpoint device 72 includes buffers 94 which form PCI Express link 96 with buffers 82. Endpoint device 74 includes buffers 98 which form PCI Express link 100 with buffers 84. Endpoint device 76 includes buffers 102 which form PCI Express link 104 with buffers 86.

In one variation of the present embodiment, control logic hardware 50 independently receives data flow measurements from switches 30, 32. These data flow measurements provide the capacity of the switch transmitting the data flow measurement to receive TLPs from Root complex 18. Since switches 30, 32 are in communication with Endpoint devices 70, 72, 74, 76, these data flow measurements also reflect indirectly the ability of these devices to receive TLPs originating from Root Complex 18. When a flow measurement related to a specific Endpoint fails to substantially change over a predetermined period of time, an error is logged. A recovery protocol is then executed after the occurrence of this error. In many circumstances, the failure of the flow measurement to change over a predetermined period of time is indicative of congestion or hardware faults in a PCIe connection. As such, the predetermined time must not be so short that inherent latency in PCI Express packet transfers causes error logging. Typically, the predetermined time period is greater than about 1 microsecond.

In one refinement, the data flow measurements are monitored by CPU 20 which executes one or more steps of the present invention. In such a circumstance, the method of the present invention is encoded in memory 24, which is available to CPU 20. Upon sensing a failure to make forward progress, CPU 20 then executes a predefined recovery protocol. In another refinement of the present invention, hardware 50 detects the failure of flow measurements to change over a predetermined period of time. In a further refinement, hardware 50 includes a computer processor implementing one or more steps of the method of the invention. In such an implementation, the computer processor will execute instructions encoded in a computer memory that is accessible to the computer processor. In still another refinement of the invention, one or more of Endpoint devices 70, 72, 74, 76 include control logic hardware that detects the failure of hierarchy tree 16 to make forward flow progress and initiate a suitable recovery protocol in response. As set forth above, such hardware may be implemented by a computer processor embedded within the Endpoint device which implements one or more steps of the method set forth below. In such an implementation, the computer processor will execute instructions encoded in a computer memory that is accessible to the computer processor embedded in the Endpoint device.

In one variation, data flow measurements used in the present embodiment are in the form of flow control credits as is known in the art. The possession of credits by Root Complex 18 from switch 20 indicates that switch 20 is able to receive TLPs from Root Complex 18. In a refinement of this variation, there is a separate flow control logic for each of the following types of packet—posted request packets, non-posted request packets, and completion packets. Therefore, in a further refinement, control logic hardware 40 includes a separate counter for posted request packets, non-posted request packets, and completion packets which tracks the number of credits.

Figure 3:
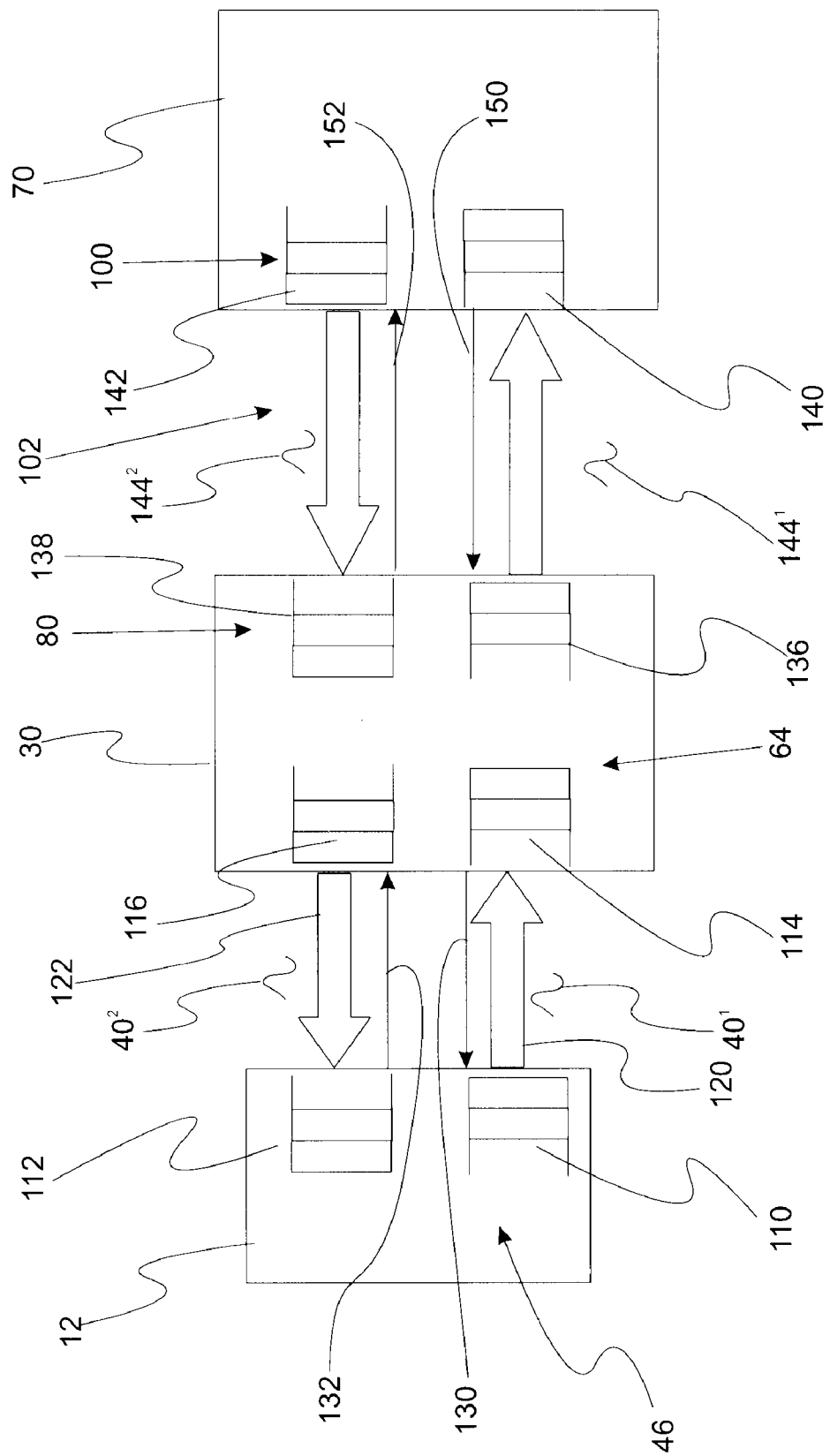
FIG. 3 is a schematic illustration showing the exchange of TLPs between a Root Complex, a switch, and an Endpoint device in accordance to an embodiment of the present invention.

With reference to FIG. 3, a schematic illustration showing the transfer between a Root Complex and a single switch and Endpoint device. As set forth above, Root Complex 18 includes buffers 46 and switch 30 includes buffers 64. These buffers hold data that is exchanged as TLPs between Root Complex 18 and switch 30. Such TLPs carry requests (posted and non-posted) and completions (either acknowledgments for non-posted writes or data for reads).

Depicted in FIG. 3 is a variation that includes transmit buffer 110 and receive buffer 112 in Root Complex 18 and receive buffers 114 and transmit buffers 116 in switch 30. Transmit buffer 110 holds data that is to be sent as TLPs $40^1$ to receive buffer 114. Transmit channel 120 is established between transmit buffer 110 and receive buffer 114 for this purpose. Similarly, transmit buffer 116 holds data to be sent as TLPs $40^2$ to receiving buffer 112. Receive channel 122 is established between transmit buffer 116 and receive buffer 112 for this purpose. Collectively, transmit channel 120 and receive channel 122 form dual simplex PCI Express link 34.

Still referring to FIG. 3, a flow data measurement is sent from switch 30 to root complex 18. Typically, flow data measurements are sent via UpdateFC DLLPs 130. The DLLP sent from switch 30 to Root Complex 18 indicates how much space is available in buffer 114 thereby gating the transmission from buffer 110. FIG. 3 depicts the generic situation. This model is equally applicable to each of the six packet types. The data flow measurement is utilized in the method set forth below to detect a lack of data flow progress. UpdateFC DLLPs 132 are also sent from Root Complex 18 to switch 30. In a similar manner, switch 30 utilizes buffers 80 to exchange TLPs with Endpoint device 70. Buffers 80 include transmit buffer 136 and receive buffer 138. Endpoint device 70 has buffers 100 which include receive buffer 140 and transmit buffer 142. TLPs $144^1$ are sent from transmit buffer 136 to receive buffer 140. This establishes transmit channel 146. Similarly, receive buffer 140 receives TLPs $144^2$ from transmit buffer 142 thereby establishing receive channel 148. Collectively, transmit channel 146 and receive channel 148 form dual simplex PCI Express link 34. Data flow information is exchanged between switch 30 and Endpoint device 70. FIG. 3 shows UpdateFC DLLPs 150, 152 being used for this purpose.

Still referring to FIG. 3, an embodiment of the present invention allows for the failure of forward progress in transmitting TLPs $40^1$ and $144^1$ to be detected and appropriately addressed. The action of UpdateFC DLLPs 130, 150 allows Root Complex 18 to appreciate such flow failures.

Figure 4:
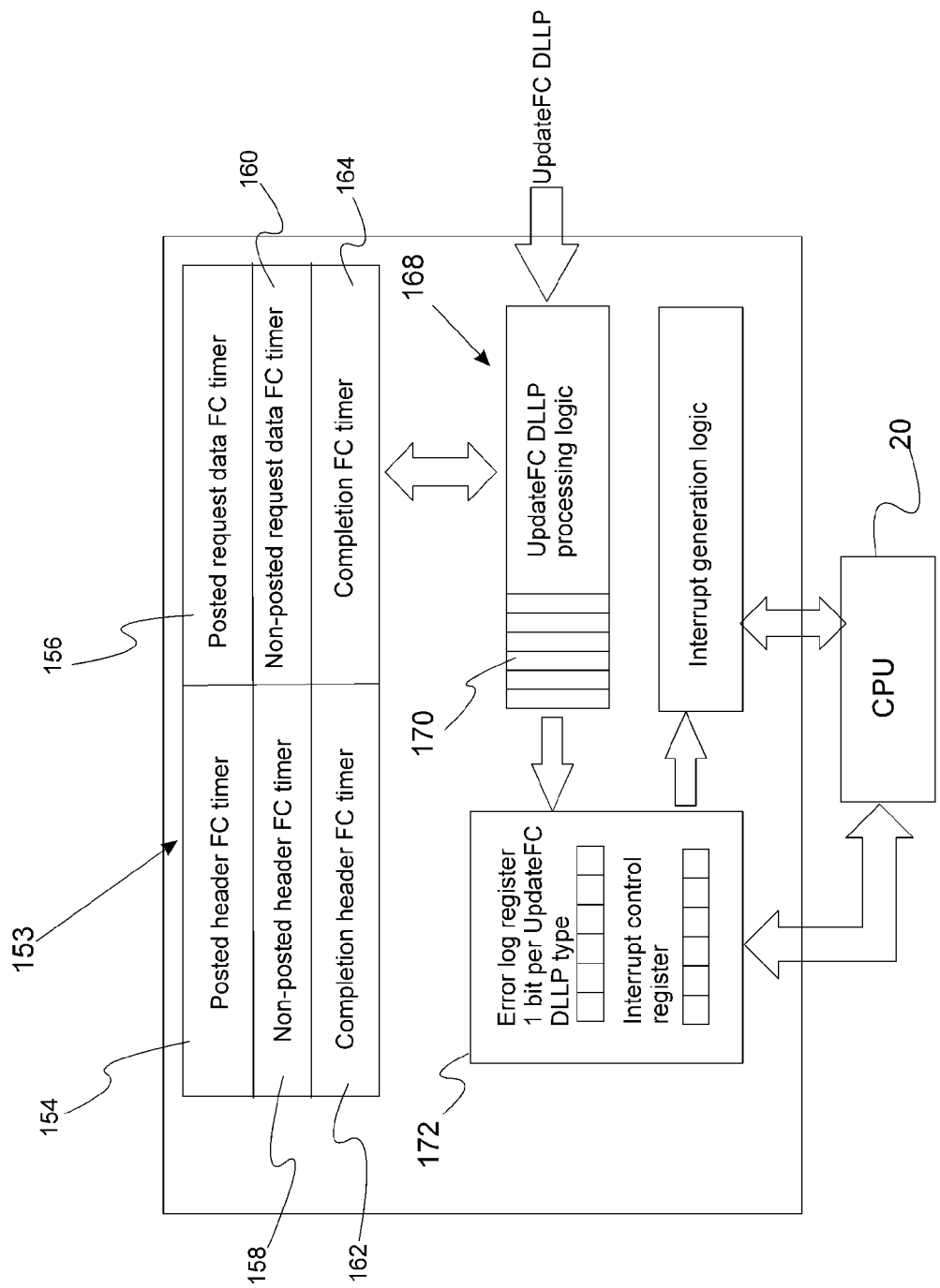
FIG. 4 is a schematic diagram of a PCI Express Root Complex adapted to implement one or more steps of an embodiment of the present invention.

With reference to FIG. 4, a schematic diagram of control logic hardware utilized by the Root Complex in various embodiments of the present invention is provided. Control hardware 50 has timeout module 153 which includes several timeout counters. For example, timeout modules include posted header flow control timer 154, posted request data flow control timer 156, non-posted header flow control timer 158, non-posted request data flow control timer 160, completion header flow control timer 162, and completion data flow control timer 164. Control hardware 50 includes UpdateFC DLLP processing logic 168. Counters 170 therein keep track of the data flow measurement. For example, flow control credits are returned from a receiver (e.g, switch or Endpoint) to a sender periodically, as the receiver frees buffer space for each respective packet type. The return of credits is done using Update Flow Control ("UpdateFC") Data Link Layer Packets "(DLLPs"), where there is a separate UpdateFC type for each of the three types above. Moreover, a given UpdateFC specifies credits for both header and data, in two separate fields. Counters 168 are utilized to keep track of these credits.

A timeout counter, such as counters 154-164, begins counting when the flow control credits for that type are exhausted (meaning the sender is not able to send any packets); the counter is reset when the credits available to the sender for that type increase as a result of receiving an UpdateFC packet. When a timeout counter reaches the programmable timeout interval value, hardware logs in error register 172 that this event occurred, and sends an interrupt to CPU 20 via. The interrupt redirects the operating system to a software module handling fault diagnosis and recovery. The timeout interval should be set so that it is one or two orders of magnitude smaller than the Completion Timeout interval. This allows software enough time to attempt whatever corrective action it can before a Completion Timeout occurs. Control hardware 50 also includes capacity module 170 which has separate flow control credit counters for header and data and for each of the three packet types.

Figure 5:
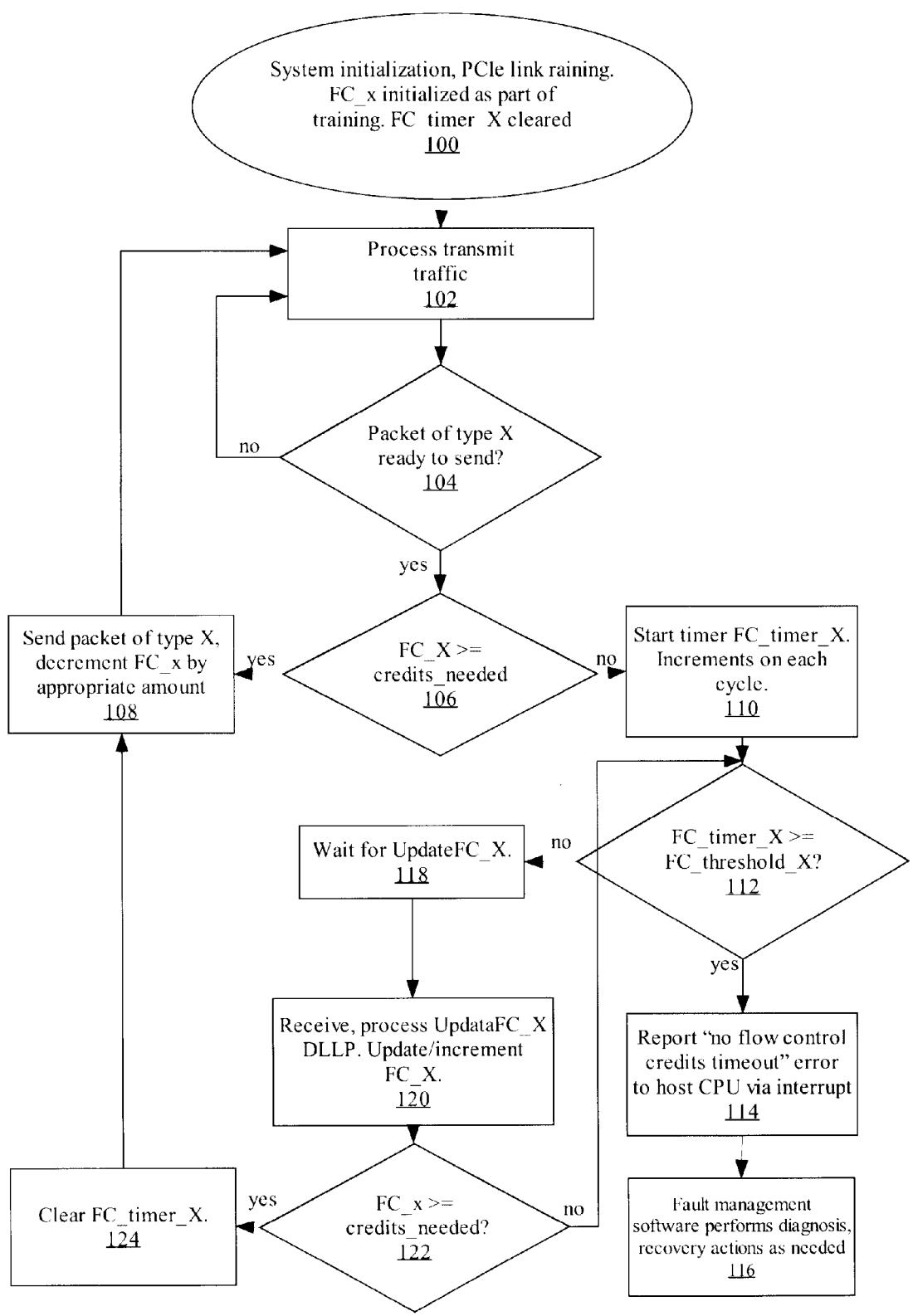
FIG. 5 is a flowchart illustrating an embodiment of a method of detecting the lack of forward progress in a PCI Express fabric.

With reference to FIG. 5, a flow chart of a method for detecting the lack of forward progress in a PCI Express I/O hierachy. The PCI express hireachy is initialized with PCIe link training as set forth in the PCI-Express specification as set forth in box 200. Flow control counter FC_x is initialized as part of this training and flow control timer FC_timer-X is cleared. Root Complex 18 then processes the transmit traffic (Box 210). In box 220, a determination is made as to whether or not packet type X is ready to send. If the packet is not ready to send, processing of the packet is continued, or the system waits to send the packet of type X. If the packet is ready to send, flow control counter FC_X is interrogated to test if its value is greater than the number of credits needed to send packet X (box 230). If there are sufficient credits, the packet of type X is sent and counter FC_X is decremented as indicated in Box 240. The system may then proceed to process additional traffic. If there aren't sufficient credits for the packet of type X, timer FC_timer_X is started (box 250). This timer is incremented at predetermined time intervals (e.g, on each CPU clock cycle or multiple thereof).

Still referring to FIG. 5, the system repetitively tests the value of timer FC_timer_X to see if it is less than a threshold value FC_threshold_X (box 260). In one variation, the value of timer FC_timer_X is received by CPU 14 which assists in the implementation of a recovery protocol. While the value of timer FC_timer_X is less than the threshold, the system waits for an update from downstream devices as illustrated in box 270. If such an update is received, counter FC_X is incremented (box 280). A test in then made to see if there are sufficient credits to send the packet of type X as indicated by box 290. If there are now sufficient credits, the timer FC_timer_X is cleared (box 300). The system then proceeds to implement the steps of box 240 in which the packet is sent and the counter FC_X is updated. If there still aren't sufficient credits at box 290 the system proceeds back to the steps of decision box 260. If an update sufficient to send the packet of type X has not occurred after the threshold FC_threshold_X is reached or surpassed, the system proceeds to report a "no flow control credits timeout." (box 310). In one variation, this error will be reported to host CPU 14. This error may be reported via an interrupt. In this variation, host CPU 14 executes code that diagnoses the error condition and/or implements a recovery protocol. (box 320). Examples of corrective actions that may be implemented in the recovery protocol include, but are not limited to, reducing the rate at which devices (Root Complex or Endpoints) issue requests, through communication with the drivers controlling those devices, reducing link bandwidth of downstream devices so that the bandwidth load on intervening switches is reduced, temporarily taking Endpoint devices offline, adjusting buffer sizes in switches to give one type of packet more space than others, and the like.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for detecting lack of forward progress in a system having a Root Complex utilizing a PCI Express interface for communicating with a connected Switch or Endpoint device, the method comprising:
    a) receiving or performing a data flow measurement, the data flow measurement providing the capacity of the connected Switch or Endpoint device to receive data packets from a Root Complex transmit channel;
    b) logging an error in response to receiving data flow measurements of the capacity of the connected Switch or Endpoint device that remain substantially unchanged after a predetermined period of time during which data flow measurements continue to be received; and
    c) executing a recovery protocol after logging of the error in step b).

2. The method of claim 1 wherein the connected device performs the data flow measurement and the Root complex receives the data flow measurement credit.

3. The method of claim 1 wherein the data flow measurement is a credit.

4. The method of claim 2 wherein the error is logged when the number of credits remains unchanged for a predetermined period of time.

5. The method of claim 1 wherein step c) comprises:
    reducing the rate at which the Root Complex issues requests to the connected device.

6. The method of claim 1 wherein step c) comprises:
    reducing link width of downstream devices so that bandwidth load on intervening switches is reduced.

7. The method of claim 1 wherein step c) comprises:
    temporarily disconnecting connected devices.

8. The method of claim 1 wherein the PCI Express module transmits and receives data packets classifiable in more than one category.

9. The method of claim 8 wherein the PCI Express module transmits and receives packets classifiable in a class selected from the group consisting of "posted requests," "non-posted requests," and "completions."

10. The method of claim 8 wherein step c) comprises:
    adjusting buffer sizes in switches to give one type of packet more space than others.

11. A PCI Express module comprising:
    a receive buffer for receiving Transaction Layer Packets ("TLPs") from a connected upstream device;
    a transmit buffer for transmitting TLPs to a connected downstream device;
    a PCI Express controller for providing TLPs to the transmit buffer and for processing TLPs received into the receive buffer;
    a dual simplex PCI Express link in communication with the transmit buffer and a connected downstream device, the dual simplex PCI express link having a receive channel and a transmit channel;
    a capacity module for providing information about the capacity of the PCI Express module to receive data;
    a timeout module operable to receive data flow information from the connected downstream device regarding a data flow measurement of the connected downstream device's capacity to receive data packets from the transmit buffer, the timeout module logging an error in response to receiving data flow measurements of the connected downstream device's capacity to receive data packets that do not change after a predetermined period of time during which data flow measurements continue to be received.

12. The PCI Express module of claim 11 wherein the timeout module logs the error to an error register.

13. The PCI Express module of claim 11 wherein the capacity module is a credit module.

14. The PCI Express module of claim 13 wherein the capacity module is operable to transmit the number of available credits to the upstream connected device.

15. The PCI Express module of claim 11 wherein the PCI Express controller is further operable to reduce the rate at which the Root Complex device issues requests to the connected device.

16. The PCI Express module of claim 11 wherein the PCI Express controller is further operable to reduce link width of downstream devices so that bandwidth load on intervening switches is reduced.

17. The PCI Express module of claim 11 wherein the PCI Express controller is further operable to temporarily disconnect connected devices.

18. The PCI Express module of claim 11 wherein the PCI Express controller is able to communicate a lack of flow control credits, such that a computer processor executes software to re-program a Root Complex to effect one or more of the following:
    reduce the rate at which the Root Complex device issues requests to the connected device;
    reduce link bandwidth of downstream devices so that bandwidth load on intervening switches is reduced; or
    temporarily disconnect connected devices.

19. The PCI Express module of claim 11 wherein the PCI Express controller is further operable to adjust buffer sizes in connected devices to provide one type of packet more space than others.

20. A method for detecting lack of forward progress in a system having a root complex in communication with a connected switch or endpoint device, the method comprising:

receiving or performing a data flow measurement indicative of capacity of the connected switch or endpoint device to receive data packets from a root complex transmit channel;

indicating a flow control timeout error in response to a no data flow measurement indicative of capacity of the connected switch or endpoint device being received for a first predetermined period of time; and indicating a forward progress error in response to receiving data flow measurements that remain substantially unchanged after a second predetermined period of time during which the data flow measurements continue to be received.

* * * * *